Sept. 25, 1934. D. H. FLEMING Re. 19,324

MACHINE FOR MAKING STEREOTYPE MATRICES

Original Filed May 10, 1932 8 Sheets-Sheet 1

INVENTOR
David H. Fleming
BY
Fred K. Schuett
ATTORNEY

Sept. 25, 1934. D. H. FLEMING Re. 19,324

MACHINE FOR MAKING STEREOTYPE MATRICES

Original Filed May 10, 1932 8 Sheets-Sheet 2

INVENTOR
David H. Fleming
BY
ATTORNEY

MACHINE FOR MAKING STEREOTYPE MATRICES

Original Filed May 10, 1932 8 Sheets-Sheet 3

INVENTOR
David H. Fleming
BY
Fred'k E. Schuster
ATTORNEY

MACHINE FOR MAKING STEREOTYPE MATRICES

Original Filed May 10, 1932 8 Sheets-Sheet 4

INVENTOR
David H. Fleming
BY
ATTORNEY

MACHINE FOR MAKING STEREOTYPE MATRICES

Original Filed May 10, 1932 8 Sheets-Sheet 5

INVENTOR
David H. Fleming
BY
ATTORNEY

MACHINE FOR MAKING STEREOTYPE MATRICES

Original Filed May 10, 1932 8 Sheets-Sheet 6

INVENTOR
David H. Fleming
BY
ATTORNEY

MACHINE FOR MAKING STEREOTYPE MATRICES

Original Filed May 10, 1932 8 Sheets-Sheet 7

INVENTOR
David H. Fleming
BY
ATTORNEY

MACHINE FOR MAKING STEREOTYPE MATRICES

Original Filed May 10, 1932 8 Sheets-Sheet 8

INVENTOR
David H. Fleming
BY
ATTORNEY

Reissued Sept. 25, 1934

Re. 19,324

UNITED STATES PATENT OFFICE 19,324

MACHINE FOR MAKING STEREOTYPE MATRICES

David H. Fleming, Norwood, Mass., assignor to F. Wesel Manufacturing Company, Scranton, Pa., a corporation of New York Original No. 1,914,497, dated June 20, 1933, Serial No. 610,397, May 10, 1932. Application for reissue June 19, 1934, Serial No. 731,385

45 Claims. (Cl. 101—12)

The invention relates to a mechanical matrix-imprinting press, more particularly of the type wherein provision is made for releasing slightly the pressure of the press head during the drying period of the matrix, as by backing off the said press head from the matrix.

An object of the invention is to provide a machine for making stereotype matrices, having means for adjusting the degree of pressure exerted by the press head or platen.

Another object of the invention is to provide a machine for making stereotype matrices, having means whereby travel of the press head or platen may be arrested at a position which affords the desired degree of pressure.

Yet another object of the invention is to provide improved means for presenting a form and matrix stock between the jaws of the press.

Still another object of the invention is the provision of improved heating means for drying the matrix while it is subjected to pressure between the jaws of the press.

A further object of the invention is to provide a machine for making stereotype matrices, having means to effect a preliminary drying of the form.

Yet a further object of the invention is the provision of improved mounting means for the heating units whereby they are accessible, and may be readily replaced without dismantling a substantial portion of the machine.

In carrying out the invention, a press head or platen member is arranged to be reciprocated toward and away from a bed plate or heated stationary platen for the form and mat, provision being made whereby the degree of pressure exerted by the head thereon may be adjusted to the desired degree. This may be effected by adjustment of a crank pin in the driving mechanism for the head or by an adjustment of the coacting pressure surface of the head itself. In order to present the form and mat between the jaws of the press, a support member or carriage is provided therefor which is mounted, as upon rollers, upon a support or table located in front of the pressure-exerting elements of the machine.

A further supporting table may also be provided with heating elements to preliminarily heat the form to the desired degree, the same being then moved forwardly by means of the carriage over the supporting rollers and between the platens of the press portion of the machine. The carriage is there received also upon rollers which project through longitudinal slots of the bed plate of the press and are carried by the reciprocable head or platen-bearing elements thereof so that as the latter are depressed to exert pressure upon the mat, the press rollers will be correspondingly depressed below the surface of the bed plate which then alone supports the form and mat for action upon said mat by the movable press head or platen.

Provision is also made for heating this bed plate and the arrangement is such, furthermore, that it is not necessary manually to remove the bed plate from its support when replacement of a heating unit or units is required. The novel arrangement, furthermore, contemplates means for mechanically separating the actual bed plate or platen from its support to admit of access to a heating unit which may be then conveniently slid out as a whole from the support.

The nature of the invention, however, will best be understood when described in connection with the accompanying drawings, in which.

Figure 1:
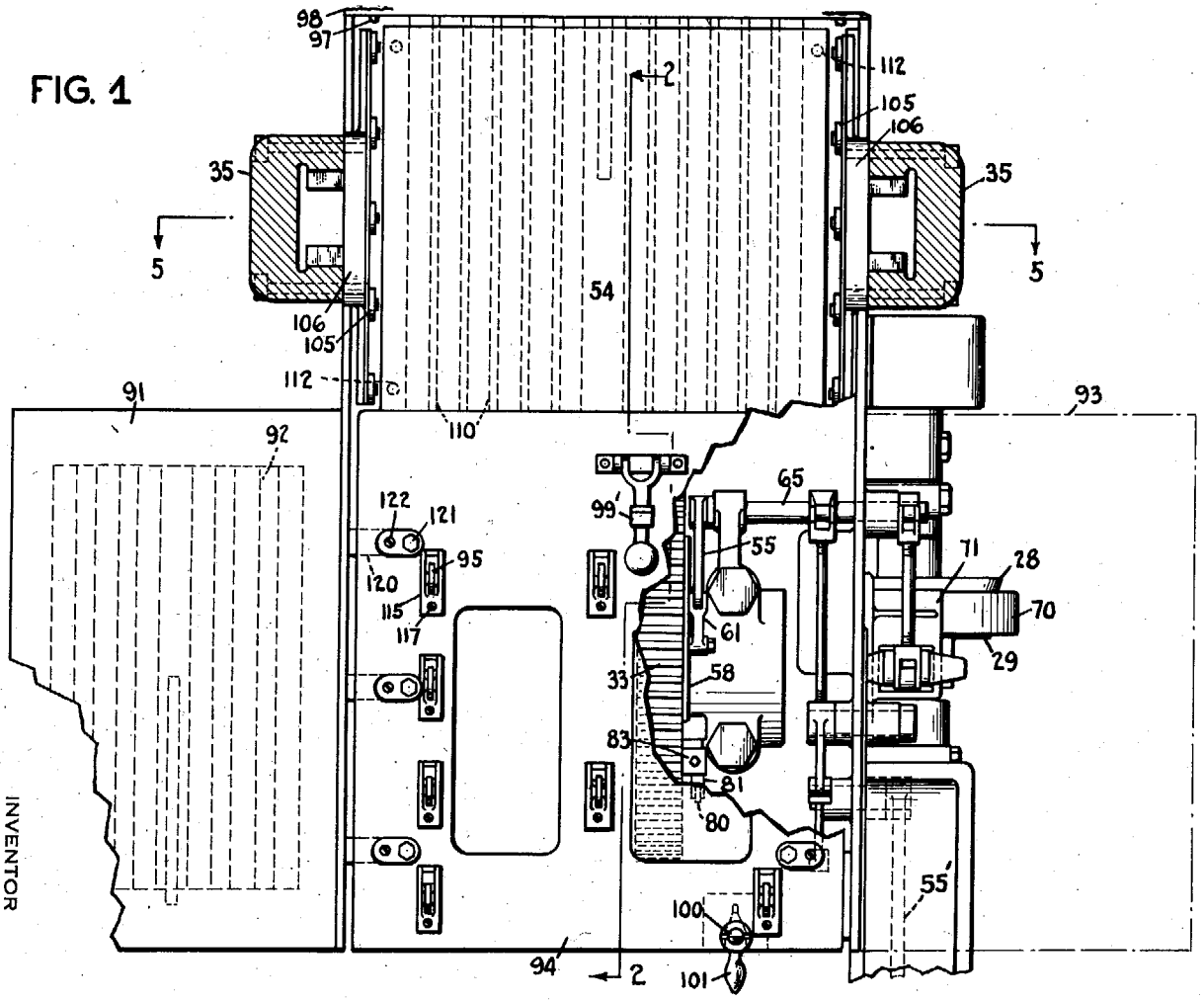
Fig. 1 is a plan view of the novel press with portions broken away, and portions in horizontal section.

Referring to the drawings, 20 designates a driving shaft for the machine and is operated from a suitable source of power (not shown). This shaft drives a sprocket wheel 21 which, through a chain 22, drives a further sprocket 23 on the clutch shaft 24. A worm 25 on worm shaft 25′ engages with the worm wheel 26 to rotate a shaft 27; and a clutch embodying the halves 28 and 29 is included between the driven sprocket 23 and the worm 25 of worm shaft 25′.

The shaft 27 carries a pair of pinions 30 and 31 meshing with respective spur gears 32 and 33 for operating the press head or platen 34 through intermediate mechanism. This head is mounted for reciprocation with a pair of slides 35 mounted in opposite sides of the machine frame and is reciprocated through a toggle device embodying the arm 36 and the arm 37 which are pivoted to each other at 38. Arm 37 constitutes one arm of a bell crank oscillatable about the pivot 39 and having the other and forked arm 40. The tines of this arm 40 are adapted to engage with a crank pin 41 secured between the juxtaposed faces of the gear wheels 32 and 33 for oscillating the said arm and correspondingly actuating the toggle device in effecting reciprocation of the press head 34.

Figure 2:
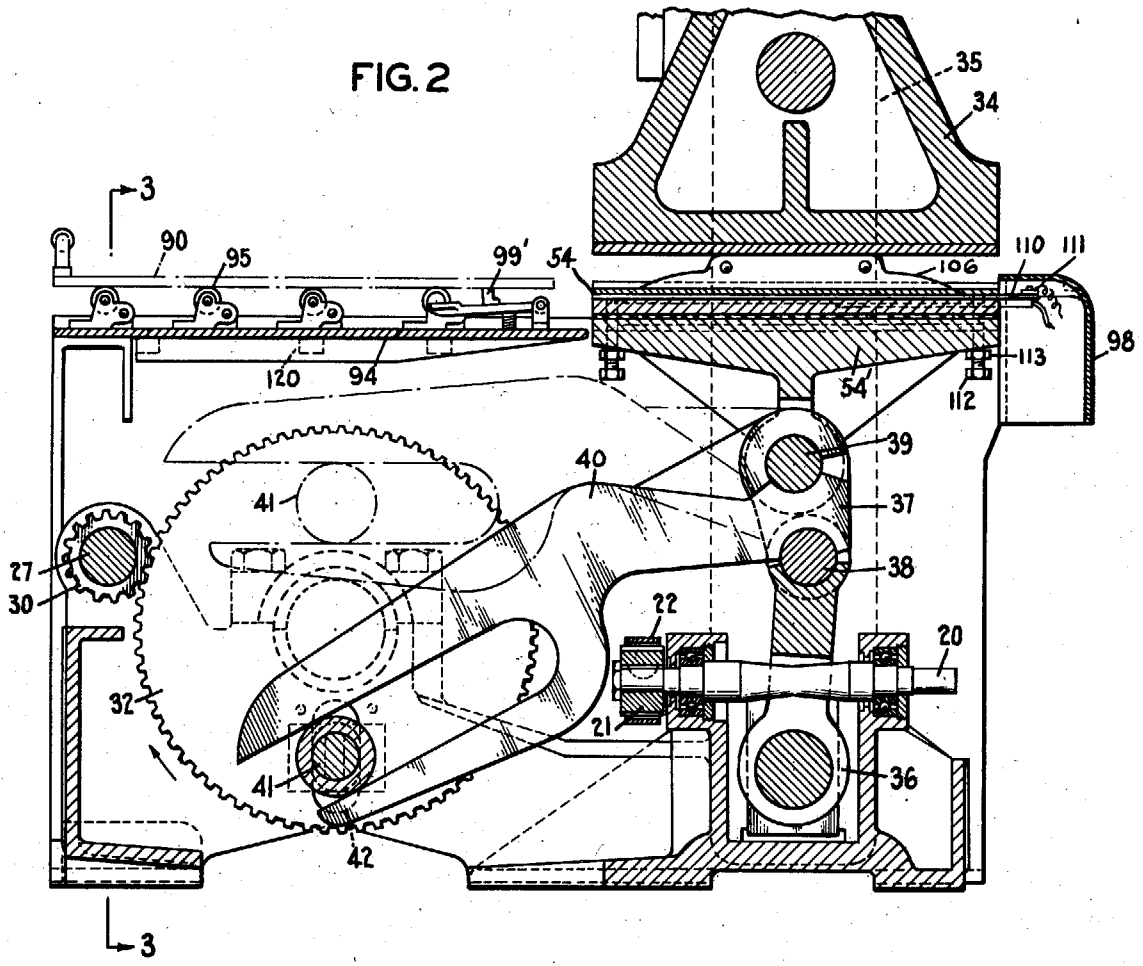
Fig. 2 is a fragmentary transverse vertical section thereof and taken on the line 2—2, Fig. 1 of the drawings.

The dotted position of the crank pin 41, Fig. 2, indicates the position for maximum throw of the toggle or maximum pressure exerted by the head, and this pressure may be varied, for example, by providing the faces of the gear wheels 32 and 33 with slots 42 in which the crank pin 41 may be adjusted to correspondingly vary the throw of the toggle.

Figure 8:
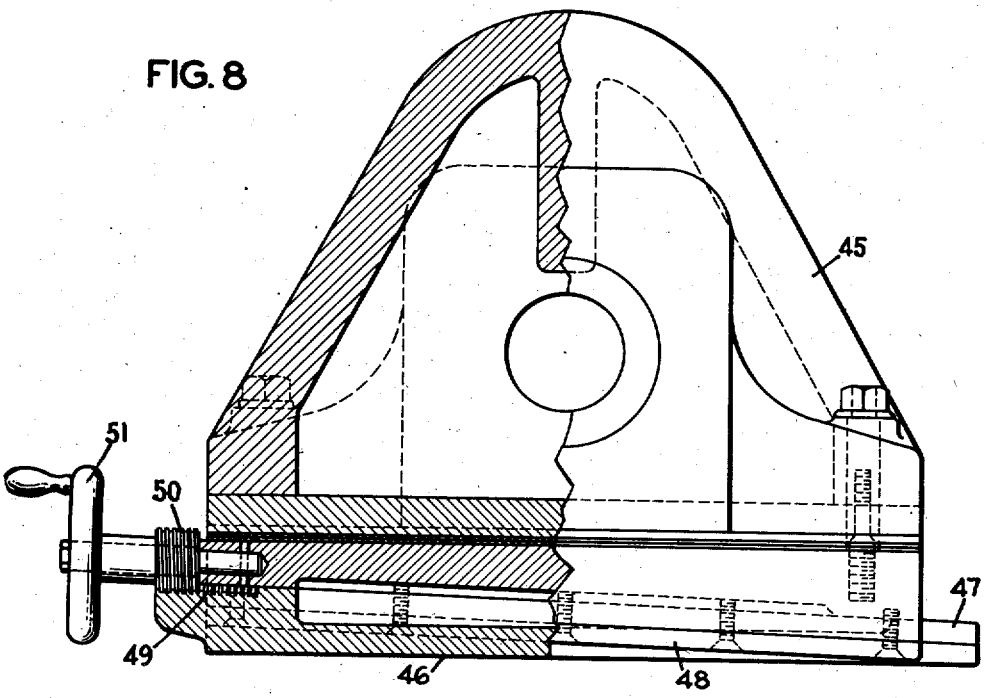
Fig. 8 is a part longitudinal section and elevation of a modification in the means for adjusting the amount of pressure exerted by the press in its operation.

Or, reference being had to Fig. 8 of the drawings, the head 45 may be operated with a fixed position crank pin and its effective pressure varied through vertical adjustment of the engaging surface 46 of platen 47 which is in the nature of a movably mounted slide adapted for vertical adjustment in the body of the head 45, as in ways 48, and positioned through the engagement of a half threaded portion 49 thereof with a screw member 50 rotatably mounted in the head and operated through the hand wheel 51. By either of these expedients, a simple means is provided for securing the desired pressure upon the mat as it is not always feasible to finally set the machine for the requisite pressure at the time of shipment.

In accordance with the invention, the head 34 after having made the desired impression in the mat is to be backed off slightly during the drying period, and to this end provision must be made for interrupting the action of the crank pin 41 and requires that the press head be instantaneously and accurately stopped at a position relatively to the bed plate or lower platen 54 with which it cooperates. This may be effected by disengaging the clutch halves 28 and 29 which is accomplished, for example, by means of a rocker arm 55 having the nose 56 adapted for engagement with the cam roller 57. The latter is adjustably carried on the face of a gear wheel 32 or 33 as through the plate 58 secured thereto by means of the studs 59 and 60 fitting in corresponding slots of the plate.

By virtue of this adjustment, it is possible to time the cessation of the backing-off action of the head and thus secure the desired degree of pressure upon the matrix during the drying period.

Roller 57 is carried at the outer end of an arm 61 pivoted to the plate 58 and is urged in the direction of rotation of a gear 32 or 33 by a spring 61′. An adjustable stop 62 limits its movement in this direction while its movement in the opposite direction is limited by an adjustable stop 63, both stops being mounted on the plate 58. Thus, as the gear wheel rotates, roller 57 will eventually engage with the nose 56, being forced toward the stop 63 and then raising the arm 55. In so doing, the shaft 65 to which this arm is secured will be correspondingly rocked and will, through the intermediate connecting mechanism, throw the driven clutch half 29 for disengagement with its driving clutch half 28, as is well understood, and thus interrupt the action of the press head at the position affording the desired degree of pressure.

As it is highly desirable that this action shall take place instantaneously and that no overrunning of the press head motion shall occur, provision is made for braking the driven clutch half 29 as it is thus drawn outwardly for disengagement with its driving half 28. To this end, an annular brake shoe 70 surrounds the periphery of the driven clutch half 29 but is normally out of contact therewith during the period of rotation of said half 29. However, when this half is drawn outwardly for disengagement, its periphery engages with the brake shoe 70, the inclination of same being at the proper angle to effect the desired braking action, and further rotation of the driven clutch half is immediately stopped.

The brake shoe 70 may conveniently be mounted upon bracket members 71; and the shoe is prevented from turning with reference to the brackets by bosses 72 fitting in ways 73 of the brackets. Moreover, a spring 74 is mounted between projections 75 of the brackets and the shoe element to urge the latter in the direction of the clutch half 28 in order to take up for wear of the said shoe. Pins 76 extending radially inwardly from brackets 71 into slots 77 of brake band 70 serve to limit the longitudinal movement of the band.

When it is desired to release the pressure on the matrix, after the desired elapsed drying period, rocker arm 55 is arranged to be raised sufficiently to permit the roller 57 to be returned to its normal position under the action of the clutch spring 61′ and permitting thereby the said arm 55 to return to a position in which the clutch halves 28 and 29 may reengage. This may be effected, for example, through a foot pedal 55′ operating through intermediate levers and linkages to rock the shaft 65 and thus operate its attached rocker arm 55 accordingly.

Figure 3:
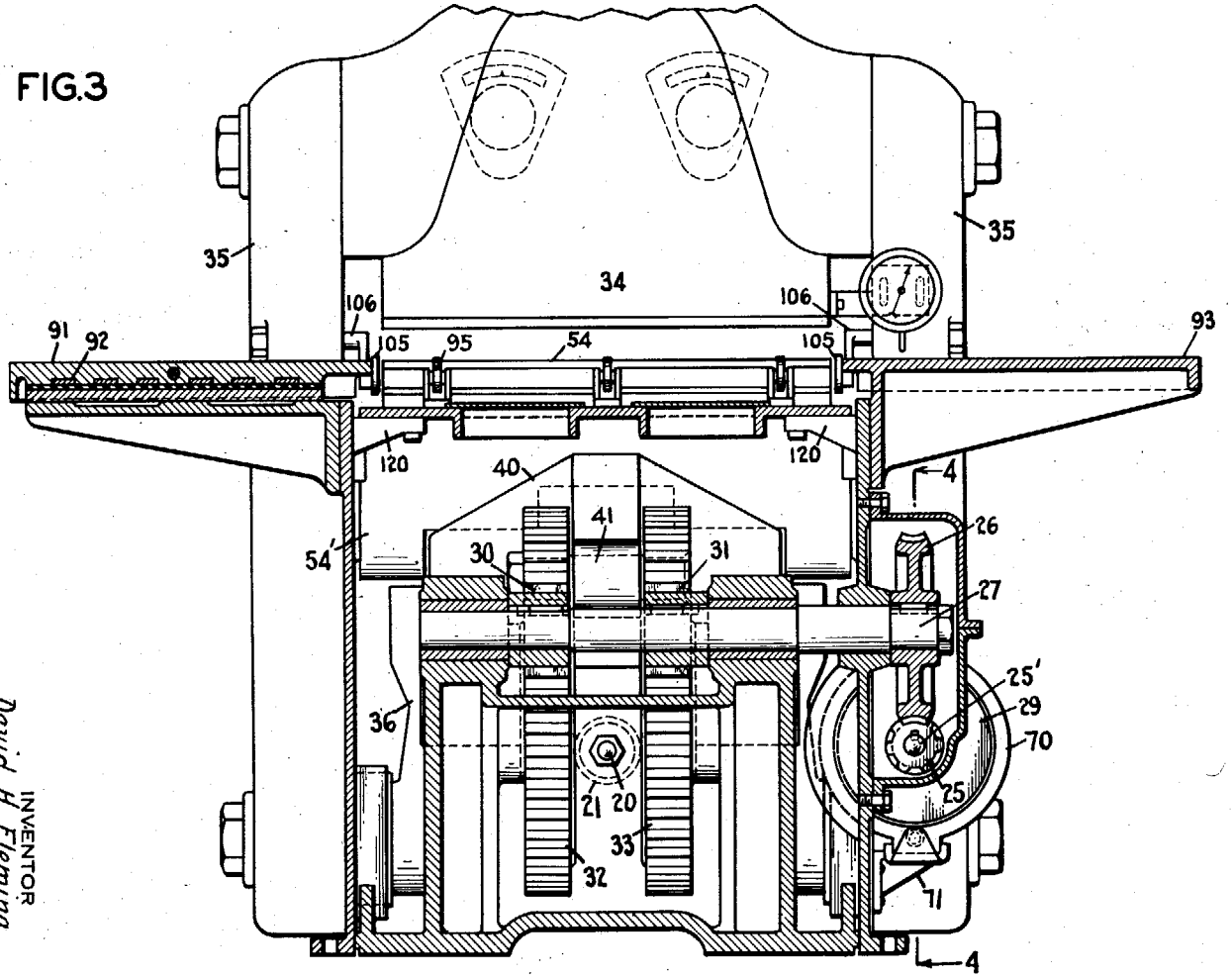
Fig. 3 is a longitudinal section taken on the line 3—3, Fig. 2 of the drawings, and looking in the direction of the arrows.
Figure 4:
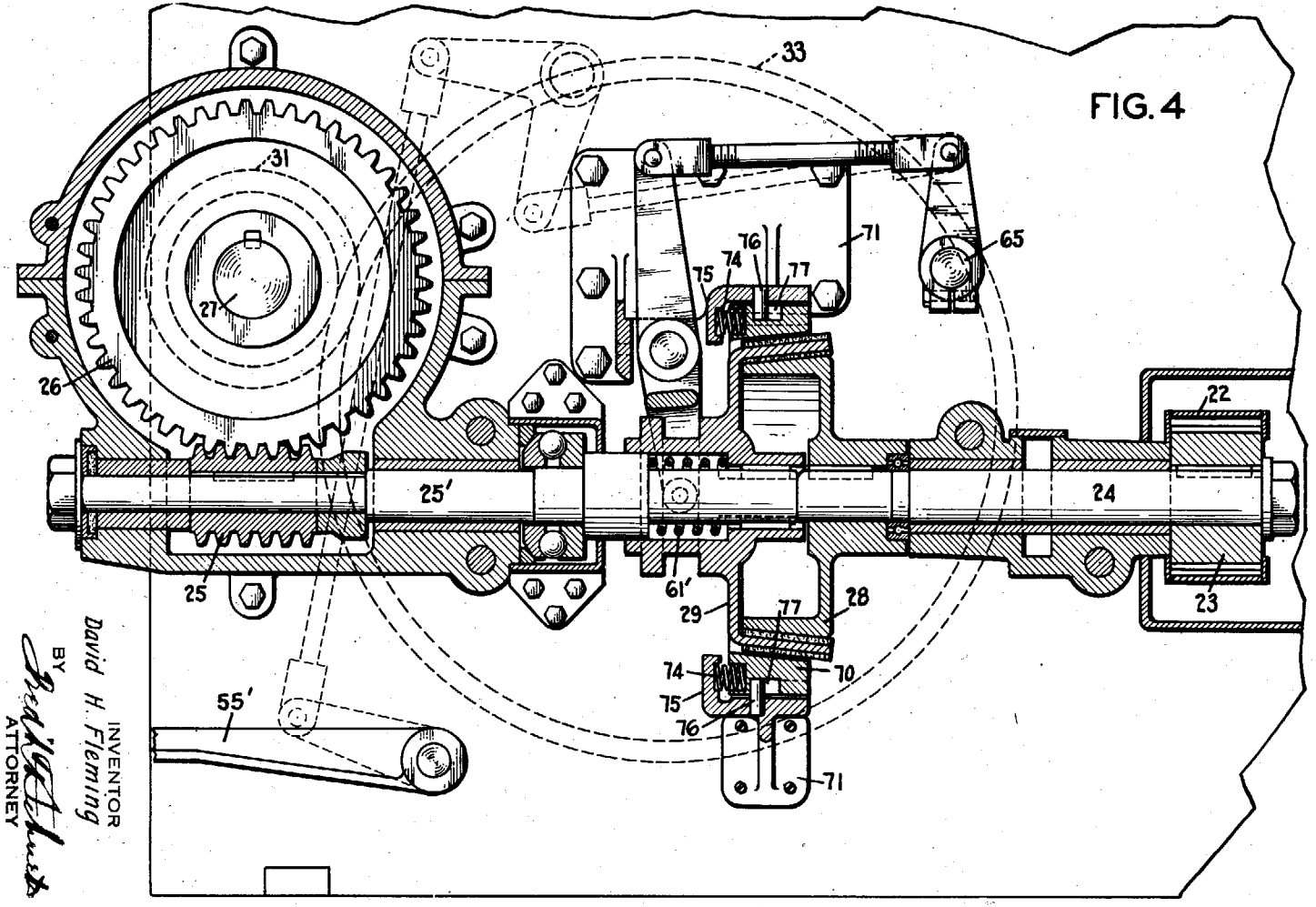
Fig. 4 is an enlarged detail vertical section taken on the line 4—4, Fig. 3 of the drawings.
Figure 5:
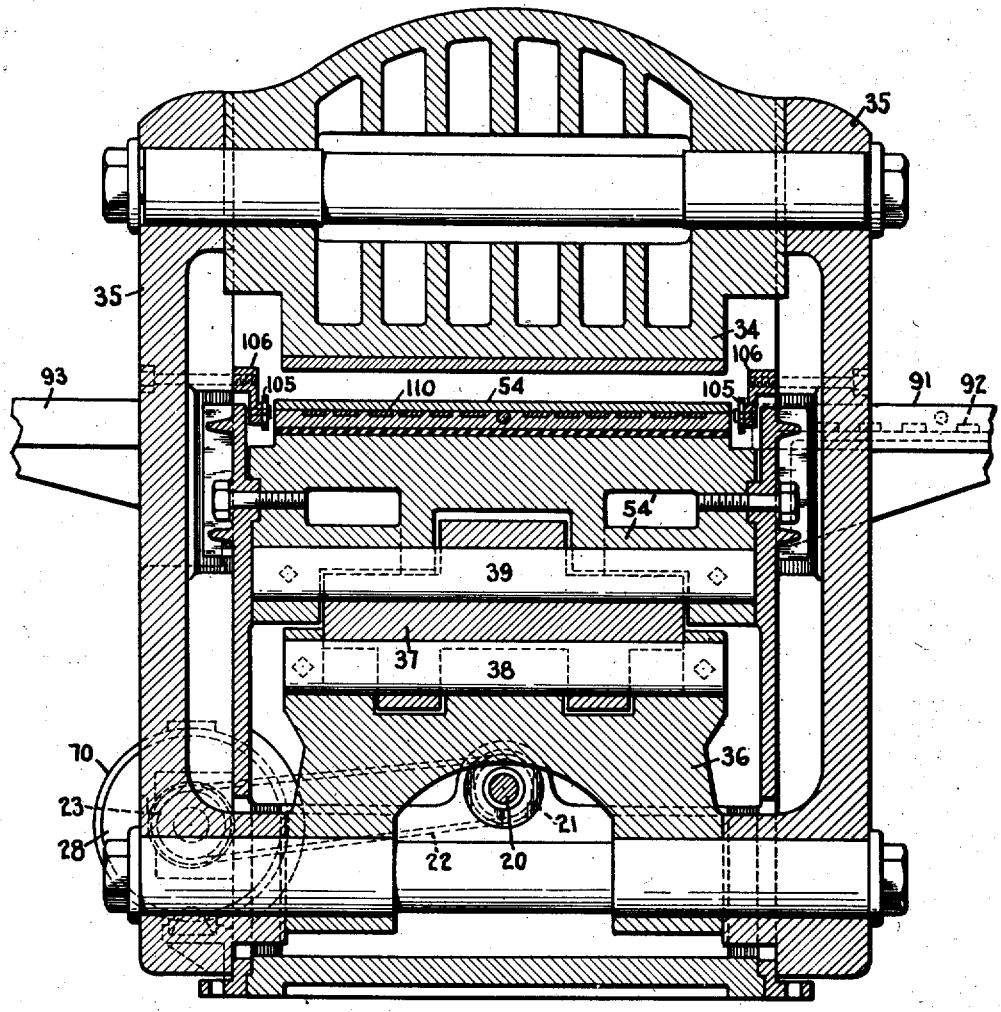
Fig. 5 is a vertical section taken on the line 5—5, Fig. 1 of the drawings and looking in the direction of the arrows.
Figure 6:
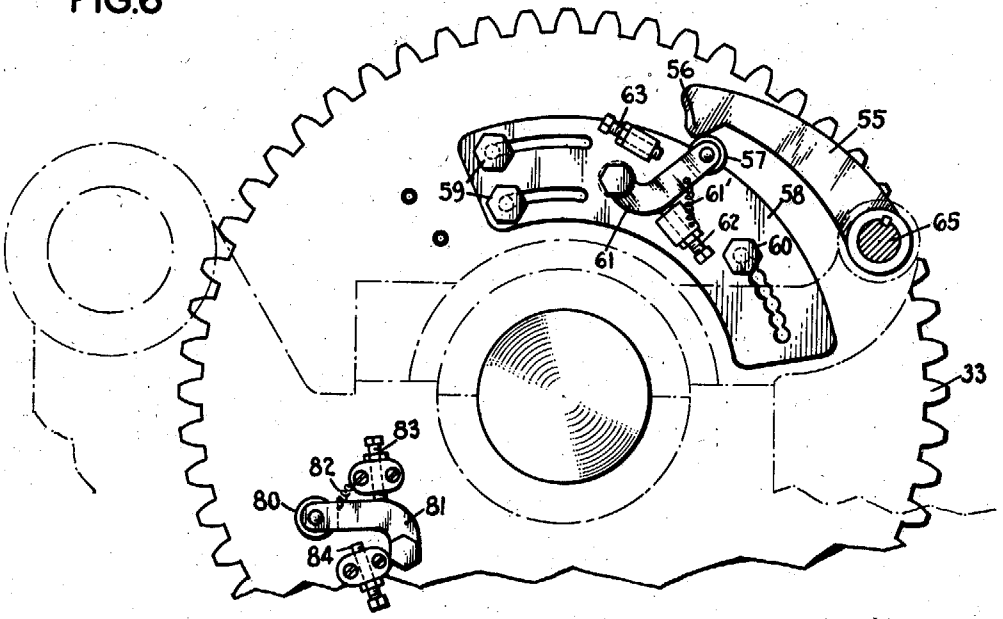
Fig. 6 is a fragmentary front elevation.
Figure 7:
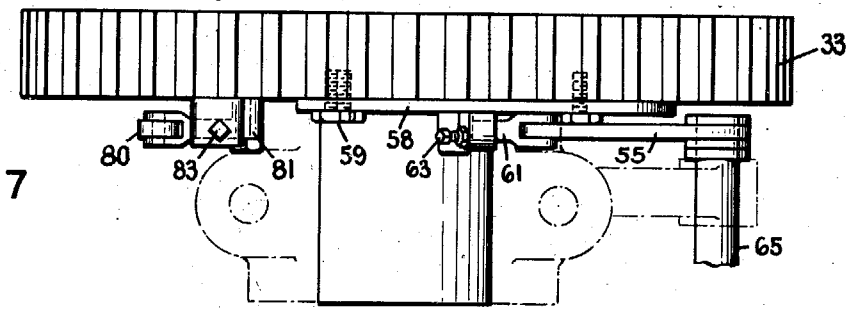
Fig. 7 is a fragmentary end elevation of a gear wheel for carrying the operating cams.

The rotation of the gear wheels 32, 33 continues until the head or platen assumes substantially its uppermost position, as indicated in Figs. 2, 3 and 5 of the drawings and in which position the crank pin 41 is substantially at its lowermost point of travel. A further cam roller 80 is to this end secured to a gear wheel 32 or 33 as upon a pivoted arm 81 attached to the surface thereof, said arm being urged by means of the spring 82 in the direction of rotation of said gear wheel and limited in this direction by means of a stop 83 and in the opposite direction by means of a stop 84. When this latter cam roller 80 then engages the nose 56 of rocker arm 55, the clutch halves 28 and 29 will again be separated and the press brought to a standstill. The operation of the press is restored by depressing the foot pedal 55′ after a new stock of matrix material with form has been inserted into the press.

For conveniently inserting such mat with form, a carriage member 90 is provided to receive the same, and the form is preliminarily supported on a laterally disposed table 91 provided with electrical heating elements 92 so that it may be brought to the desired temperature externally of the machine and during the period that an impressed mat or matrix is drying and under pressure within the press. At the opposite side of the machine, a further and delivery table 93 may be provided to receive the finished matrix after the same has been withdrawn from the press.

When ready for entry into the press, carriage 90 is brought over a further table portion 94 in front of the press portion of the machine and constituted by a plurality of longitudinally disposed rollers 95 upon which this carriage is adapted to ride and be directed into the press portion between the bed plate 54 thereof and the head or platen 34. Moreover, in thus directing the carriage with its material into the press proper, a limit stop in the nature of a spring-urged abutment plunger 97 is provided in the wall of a cover member 98 at one side of the press frame for engagement with the carrier plate or carriage 90 for the form and mat to be operated on within the press; and a spring-urged latch 99 drops behind the outer end of the carriage to insure its position in the press when the head descends.

Furthermore, when withdrawing the carriage and in order to limit its outward movement, the underside of the carriage is notched as at 99 to receive a spring-pressed pin 100 which snaps therein to lock said carriage in its withdrawn position for unloading and reloading. When it is desired to again return the carriage, pin 100 is withdrawn from the notch 99 through the operation of a release lever 101 pivotally attached to the pin. As the carriage 90 leaves the rollers 95 on entering the press proper, it is received upon further rollers 105 carried by brackets 106 located upon the movable straps or connecting members 35 transmitting the reciprocatory motion from the toggle to the head 34.

The position of the uppermost level of these rollers is such that when the head 34 is also in its uppermost position, the periphery of the rollers will receive the carriage 90 to locate the same over the bed plate 54. However, as the press head descends, the rollers 105 move downwardly therewith, leaving the carriage resting solely upon the bed plate 54, the head 34 pressing then upon the mat and form as said head further descends.

Beneath the bed plate 54 is also arranged a succession of longitudinally disposed electrical heating units 110 connected together at their outer ends by means of a strap 111 to which electrical connection may be made in any convenient manner to energize all of these units in parallel. In case one or more of the said units should become defective and require replacement, it would, ordinarily, be necessary to manually remove the entire bed plate 54 and support 54' which requires dismantling of a portion of the machine; and as very little space is afforded between the bed plate and head of the press, this is not such a simple procedure.

Figure 9:
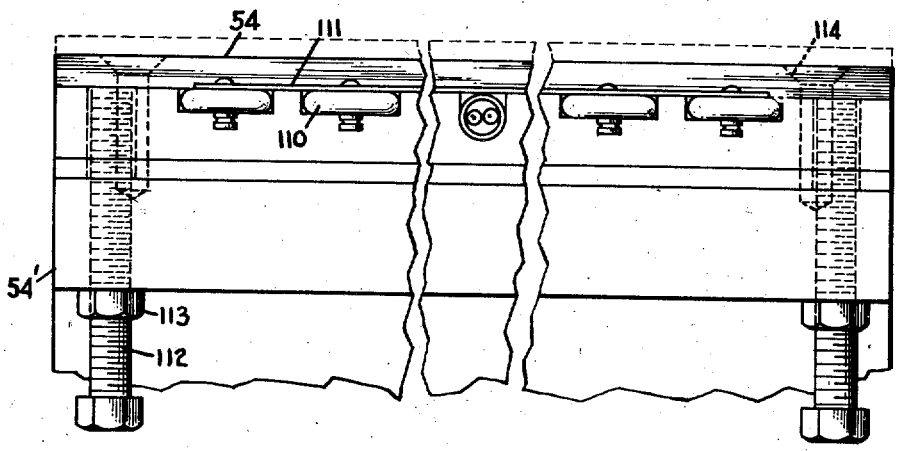
Fig. 9 is a fragmentary front elevational view, showing the arrangement of the heating units and the means provided to permit access to the units.

Provision is therefore made for raising the upper portion or bed plate 54 with reference to its support, for example, to the position indicated in dotted lines, Fig. 9. To this end, adjustable bolts 112 are provided to thread through the said support and have their inner ends engaging the bottom surface of the bed plate and jack up the same, a lock nut 113 being associated with a bolt to fix it in position when utilized for lifting the bed plate as aforesaid. By thus effecting a separation between a bed plate and its support, a heating unit 110 is rendered accessible and may readily be drawn out of its groove or pocket, after first disengaging the strap 111, and a new unit substituted. Screws 114 normally secure the bed plate in its depressed position and must, of course, first be loosened before attempting to jack up the upper portion 54 or the bed plate.

Figure 10:
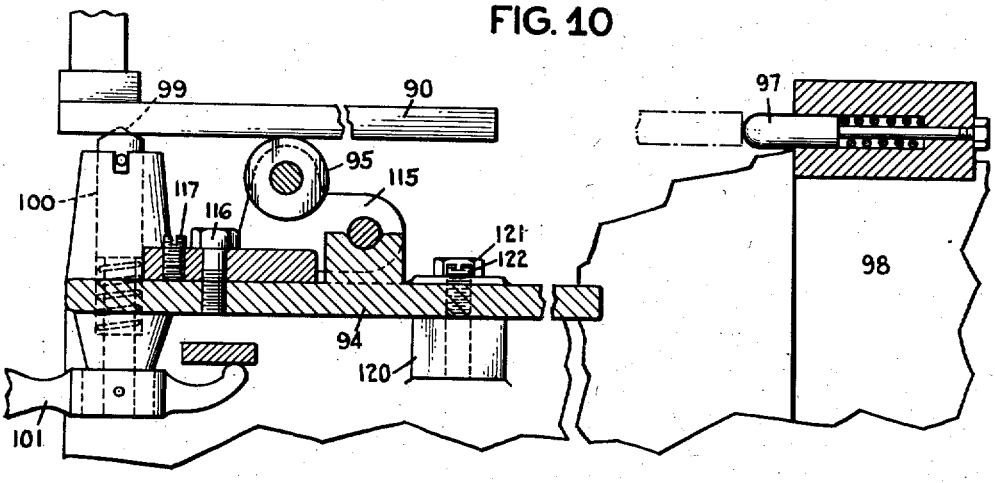
Fig. 10 is a fragmentary longitudinal section of the carriage support for the form and stock or mat.
Figure 11:
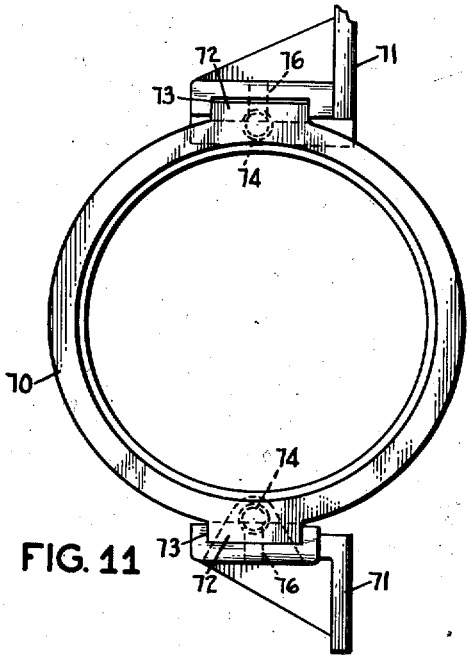
Fig. 11 is a detail elevation of the brake member associated with the driven clutch element of a clutch device included in the driving train.

Furthermore, the rollers 95 may be adjusted relatively to table 94 for levelling the carriage 90 as it passes thereover, and to this end are carried by a bifurcated bracket 115, Fig. 10, pivoted to the table, this bracket being also adapted to be rigidly secured to the table as by bolts 116. When these bolts are loosened a roller may be rocked relatively to the table by the adjustment of set screws 117 passing through the base of a bracket and working against the table surface. When the desired position of a roller is attained, bolts 116 are clamped to fix the location. Moreover, the table as a whole may also be adjusted relatively to the machine frame to correct inaccuracies of construction as by securing the said table to lateral supports 120 of the press frame through bolts 121, set screws 122 passing also through the table and abutting the supports. By correspondingly adjusting these set screws, the desired level of the table may be secured, whereupon the bolts 121 are tightened.

I claim:

1. In a machine for making stereotype matrices and including a stationary platen, a movable platen, means for reciprocating the latter, and means for releasing slightly the pressure of the movable platen upon a matrix; anti-friction members affording a support before the platens, a carriage movable thereover between the stationary and movable platens, and anti-friction supporting members movable with the movable platen and adapted to receive the carriage from the aforesaid anti-friction supporting members.

2. In a machine for making stereotype matrices and including a stationary platen, a movable platen, means for reciprocating the latter, and means for releasing slightly the pressure of the movable platen upon a matrix; anti-friction members affording a support before the platens, a carriage movable thereover between the stationary and movable platens, and a heated table adjacent the said anti-friction supporting members.

3. In a machine for making stereotype matrices and including a stationary platen, a movable platen, means for reciprocating the latter, and means for releasing slightly the pressure of the movable platen upon a matrix; anti-friction members affording a support before the platens, a carriage movable thereover between the stationary and movable platens, a heated table adjacent the said anti-friction supporting members and a delivery table upon the opposite side of the anti-friction supporting member.

4. In a machine for making stereotype matrices and including a stationary platen, a movable platen, means for reciprocating the latter, and means for releasing slightly the pressure of the movable platen upon a matrix; anti-friction members affording a support before the platens, a carriage movable thereover between the stationary and movable platens, anti-friction supporting members movable with the movable platen and adapted to receive the carriage from the aforesaid anti-friction supporting members, and means to adjust the level of the first-named anti-friction supporting members.

5. In a machine for making stereotype matrices, a stationary platen, a movable platen, means for reciprocating said movable platen, means for slightly releasing the pressure of the movable platen upon a matrix and means for drying the matrix comprising electrical heating elements mounted in one of the platens.

6. In a machine for making stereotype matrices, a stationary platen, means for reciprocating said movable platen, a movable platen, means for slightly releasing the pressure of the movable platen upon a matrix, and means for drying the matrix comprising electrical heating elements mounted in the stationary platen.

7. In a machine for making stereotype matrices, a stationary platen including a support therefor, a movable platen, means for reciprocating said movable platen and means for drying the matrix comprising electrical heating elements slidably supported in the stationary platen support.

8. In a machine for making stereotype matrices, a stationary platen including a support therefor, a movable platen, means for reciprocating said movable platen, means for slightly releasing the pressure of the movable platen upon a matrix, and means for drying the matrix comprising electrical heating elements detachably mounted in the stationary platen support.

9. In a machine for making stereotype matrices, a stationary platen including a support therefor, a movable platen, means for reciprocating said movable platen, means for slightly releasing the pressure of the movable platen upon a matrix, and means for drying the matrix comprising electrical heating elements mounted in the stationary platen support.

10. In a machine for making stereotype matrices, a stationary platen including a support therefor, having a groove formed therein, a movable platen, means for reciprocating said movable platen and means for drying the matrix comprising an electrical heating element slidably mounted in the groove formed in the support for the stationary platen.

11. In a machine for making stereotype matrices, a stationary platen including a support therefor, having a groove formed therein, a movable platen, means for reciprocating said movable platen, means for slightly releasing the pressure of the movable platen upon a matrix, and means for drying the matrix comprising an electrical heating element slidably mounted in the groove formed in the support for the stationary platen.

12. A machine for making stereotype matrices, including a stationary platen, a movable platen and means for reciprocating the movable platen to apply pressure to a matrix, a support member for the matrix and form from which an impression is to be made, said support being movable into and out of position between the platens and means for drying the matrix while it is subject to pressure between the platens, comprising electrical heating elements slidably supported in one of the platens.

13. A machine for making stereotype matrices, including a stationary platen, a movable platen and means for reciprocating the movable platen to apply pressure to a matrix, a support member for the matrix and form from which an impression is to be made, said support being movable into and out of position between the platens and means for drying the matrix while it is subject to pressure between the platens, comprising electrical heating elements slidably supported in the stationary platen.

14. A machine for making stereotype matrices, including a stationary platen, a movable platen and means for reciprocating the movable platen to apply pressure to a matrix, means for drying a matrix while it is subject to pressure between the platens, comprising electrical heating elements mounted in one of the platens and means for slightly releasing the pressure of the movable platen upon a matrix, whereby molding and drying of the matrix is effected simultaneously.

15. In a machine for making stereotype matrices, including a stationary platen, a movable platen and means for reciprocating the movable platen to apply pressure to a matrix, the combination of means for drying a matrix while it is subject to pressure and means for slightly releasing the pressure of the movable platen upon a matrix, whereby molding and drying of the matrix is effected simultaneously.

16. In a machine for making stereotype matrices, including a stationary platen, a movable platen and means for reciprocating the movable platen to apply pressure to a matrix, the combination of a support member for the matrix and form from which an impression is to made; said support being movable into and out of position between the platens, means for drying a matrix while it is subject to pressure, and means for slightly releasing the pressure of the movable platen upon a matrix whereby molding and drying of the matrix is effected simultaneously.

17. In a machine for making stereotype matrices, including a stationary platen, a movable platen and means for reciprocating the movable platen to apply pressure to a matrix, a support member for the matrix and form from which an impression is to be made, said support being movable into and out of position between the platens, means for drying a matrix while it is subject to pressure comprising an electrical heating element mounted in one of the platens and means for slightly releasing the pressure of the movable platen upon a matrix, whereby molding and drying of the matrix is effected simultaneously.

18. A machine for making stereotype matrices, including a stationary platen, a movable platen, and means for reciprocating the movable platen to apply pressure to a matrix, anti-friction members affording a support before the platens, a carriage movable thereover between the stationary and movable platens, said carriage being adapted to support a matrix and form from which an impression is to be made, and means for drying the matrix while it is subject to pressure between the platens, comprising electrical heating elements slidably supported in one of the platens.

19. A machine for making stereotype matrices, including a stationary platen, a movable platen, and means for reciprocating the movable platen to apply pressure to a matrix, anti-friction members affording a support before the platens, a carriage movable thereover between the stationary and movable platens, said carriage being adapted to support a matrix and form from which an impression is to be made, and means for drying the matrix while it is subject to pressure between the platens, comprising electrical heating elements slidably supported in the stationary platen.

20. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, said carriage being adapted to support a matrix and form from which an impression is to be made and means for drying the matrix while it is subject to pressure between the platens, comprising electrical heating elements mounted in one of the platens.

21. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, said carriage being adapted to support a matrix and form from which an impression is to be made and means for drying the matrix while it is subject to pressure between the platens, comprising electrical heating elements mounted in the stationary platen.

22. A machine for making stereotype matrices, including a stationary platen, a movable platen and means for reciprocating the movable platen to apply pressure to a matrix, anti-friction members affording a support before the platens, a carriage movable thereover between the stationary and movable platens, said carriage being adapted to support a matrix and form from which an impression is to be made, anti-friction supporting members movable with the movable platen and adapted to receive the carriage from the first mentioned anti-friction supporting members and means for drying the matrix while it is subject to pressure between the platens, comprising electrical heating elements in one of the platens.

23. A machine for making stereotype matrices, including a stationary platen, a movable platen and means for reciprocating the movable platen to apply pressure to a matrix, anti-friction members affording a support before the platens, a carriage movable thereover between the stationary and movable platens, said carriage being adapted to support a matrix and form from which an impression is to be made, anti-friction supporting members movable with the movable platen and adapted to receive the carriage from the first mentioned anti-friction supporting members and means for drying the matrix while it is subject to pressure between the platens, comprising electrical heating elements mounted in the stationary platen.

24. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, said carriage being adapted to support a matrix and form from which an impression is to be made, anti-friction supporting members movable with the movable platen and adapted to receive the carriage from the first mentioned anti-friction supporting members and means for drying the matrix while it is subject to pressure between the platens, comprising electrical heating elements mounted in one of the platens.

25. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, said carriage being adapted to support a matrix and form from which an impression is to be made, anti-friction supporting members movable with the movable platen and adapted to receive the carriage from the first mentioned anti-friction supporting members and means for drying the matrix while it is subject to pressure between the platens, comprising electrical heating elements mounted in the stationary platen.

26. A machine for making stereotype matrices, including a stationary platen, a movable platen and means for reciprocating the movable platen to apply pressure to a matrix, anti-friction members affording a support before the platens, a carriage movable thereover between the stationary and movable platens, said carriage being adapted to support a matrix and form from which an impression is to be made, a heated table adjacent said anti-friction supporting members, for preliminarily heating the matrix before molding, and means for drying the matrix while it is subject to pressure between the platens comprising electrical heating elements mounted in one of the platens.

27. A machine for making stereotype matrices, including a stationary platen, a movable platen and means for reciprocating the movable platen to apply pressure to a matrix, anti-friction members affording a support before the platens, a carriage movable thereover between the stationary and movable platens, said carriage being adapted to support a matrix and form from which an impression is to be made, a heated table adjacent said anti-friction supporting members for preliminarily heating the matrix before molding, and means for drying the matrix while it is subject to pressure between the platens comprising electrical heating elements mounted in the stationary platen.

28. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, said carriage being adapted to support a matrix and form from which an impression is to be made, a heated table adjacent said anti-friction supporting members for preliminarily heating the matrix before molding, and means for drying the matrix while it is subject to pressure between the platens comprising electrical heating elements mounted in one of the platens.

29. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, said carriage being adapted to support a matrix and form from which an impression is to be made, a heated table adjacent said anti-friction supporting members for preliminarily heating the matrix before molding, and means for drying the matrix while it is subject to pressure between the platens comprising electrical heating elements mounted in the stationary platen.

30. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, said carriage being adapted to support a matrix and form from which an impression is to be made, a heated table adjacent said anti-friction supporting members for preliminarily heating the matrix before molding, anti-friction supporting members movable with the movable platen and adapted to receive the carriage from the first mentioned anti-friction supporting members and means for drying the matrix while it is subject to pressure between the platens, comprising electrical heating elements mounted in one of the platens.

31. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, said carriage being adapted to support a matrix and form from which an impression is to be made, a heated table adjacent said anti-friction supporting members for preliminarily heating the matrix before molding, anti-friction supporting members movable with the movable platen and adapted to receive the carriage from the first mentioned anti-friction supporting members and means for drying the matrix while it is subject to pressure between the platens, comprising electrical heating elements mounted in the stationary platen.

32. A machine for making stereotype matrices, including a stationary platen, a movable platen, and means for reciprocating the movable platen to apply pressure to a matrix, anti-friction members affording a support before the platens, a carriage movable thereover between the stationary and movable platens, means to lock the carriage against withdrawal when located between the platens, said carriage being adapted to support a matrix and form from which an impression is to be made, and means for drying the matrix while it is subject to pressure between the platens, comprising electrical heating elements slidably supported in one of the platens.

33. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, means to lock the carriage against withdrawal when located between the platens, said carriage being adapted to support a matrix and form from which an impression is to be made and means for drying the matrix while it is subject to pressure between the platens, comprising electrical heating elements mounted in one of the platens.

34. A machine for making stereotype matrices, including a stationary platen, a movable platen and means for reciprocating the movable platen to apply pressure to a matrix, anti-friction members affording a support before the platens, a carriage movable thereover between the stationary and movable platens, means to lock the carriage against withdrawal when located between the platens, said carriage being adapted to support a matrix and form from which an impression is to be made, anti-friction supportng members movable with the movable platen and adapted to receive the carriage from the first mentioned anti-friction supporting members and means for drying the matrix while it is subject to pressure between the platens, comprising electrical heating elements mounted in one of the platens.

35. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, means to lock the carriage against withdrawal when located between the platens, said carriage being adapted to support a matrix and form from which an impression is to be made, anti-friction supporting members movable with the movable platen and adapted to receive the carriage from the first mentioned anti-friction supporting members and means for drying the matrix while it is subject to pressure between the platens, comprising electrical heating elements mounted in one of the platens.

36. A machine for making stereotype matrices, including a stationary platen, a movable platen and means for reciprocating the movable platen to apply pressure to a matrix, anti-friction members affording a support before the platens, a carriage movable thereover between the stationary and movable platens, means to lock the carriage against withdrawal when located between the platens, said carriage being adapted to support a matrix and form from which an impression is to be made, a heated table adjacent said anti-friction supporting members for preliminarily heating the matrix before molding, and means for drying the matrix while it is subject to pressure between the platens comprising electrical heating elements mounted in one of the platens.

37. A machine for making stereotype matrices, including a stationary platen, a movable platen and means for reciprocating the movable platen to apply pressure to a matrix, anti-friction members affording a support before the platens, a carriage movable thereover between the stationary and movable platens, said carriage being adapted to support a matrix and form from which an impression is to be made, a heated table adjacent said anti-friction supporting members for preliminarily heating the matrix before molding, a delivery table upon the opposite side of the anti-friction supporting members and means for drying the matrix while it is subject to pressure between the platens comprising electrical heating elements mounted in one of the platens.

38. A machine for making stereotype matrices, including a stationary platen, a movable platen and means for reciprocating the movable platen to apply pressure to a matrix, means for slightly releasing the pressure of the movable platen upon a matrix, anti-friction members affording a support before the platens, a carriage movable thereover between the stationary and movable platens, said carriage being adapted to support a matrix and form from which an impression is to be made, a heated table adjacent said anti-friction supporting members for preliminarily heating the matrix before molding, a delivery table upon the opposite side of the anti-friction supporting members and means for drying the matrix while it is subject to pressure between the platens comprising electrical heating elements mounted in one of the platens.

39. In a machine for making stereotype matrices, a stationary platen including a support therefor, a movable platen, means for reciprocating said movable platen, means for slightly releasing the pressure of the movable platen upon a matrix, means for drying the matrix comprising electrical heating elements mounted in the stationary platen support and means to displace the stationary platen relatively to its support to permit access to the heating units.

40. In a machine for making stereotype matrices, a stationary platen including a support therefor, having a groove formed therein, a movable platen, means for reciprocating said movable platen, means for drying the matrix comprising an electrical heating element slidably mounted in the groove formed in the stationary platen support and means to displace the stationary platen relatively to its support to permit access to the heating units.

41. In a machine for making stereotype matrices, a stationary platen including a support therefor, having a groove formed therein, a movable platen, means for reciprocating said movable platen, means for slightly releasing the pressure of the movable platen upon a matrix, means for drying the matrix comprising an electrical heating element slidably mounted in the groove formed in the stationary platen support, and means to displace the stationary platen relatively to its support to permit access to the heating units.

42. A machine for making stereotype matrices, including a stationary platen, a movable platen and means for reciprocating the movable platen to apply pressure to a matrix, means for drying a matrix while it is subject to pressure between the platens, comprising electrical heating elements mounted in one of the platens, and means for automatically partially releasing the pressure upon a matrix during the drying period, whereby molding and drying of the matrix is effected simultaneously.

43. A machine for making stereotype matrices, including a stationary platen, a movable platen and means for reciprocating the movable platen to apply pressure to a matrix, means for drying a matrix while it is subject to pressure between the platens, comprising electrical heating elements mounted in one of the platens, and means operable at a predetermined time during the drying period for partially releasing the pressure upon a matrix, whereby molding and drying of the matrix is effected simultaneously.

44. In a machine for making stereotype matrices, including a stationary platen, a movable platen and means for reciprocating the movable platen to apply pressure to a matrix, the combination of a support member for the matrix and form from which an impression is to be made, said support being movable into and out of position between the platens, means for drying the matrix while it is subject to pressure and means for automatically partially releasing the pressure upon a matrix during the drying period, whereby molding and drying of the matrix is effected simultaneously.

45. In a machine for making stereotype matrices, including a stationary platen, a movable platen and means for reciprocating the movable platen to apply pressure to a matrix, the combination of a support member for the matrix and form from which an impression is to be made, said support being movable into and out of position between the platens, means for drying the matrix while it is subject to pressure and means operable at a predetermined time during the drying period for partially releasing the pressure upon a matrix, whereby molding and drying of the matrix is effected simultaneously.

DAVID H. FLEMING.